(12) United States Patent
Khare

(10) Patent No.: US 11,374,745 B1
(45) Date of Patent: Jun. 28, 2022

(54) KEY USAGE TRACKING USING TPM

(71) Applicant: Amazon Technologies, Inc., Seattle, WA (US)

(72) Inventor: Atul Khare, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 178 days.

(21) Appl. No.: 15/826,491

(22) Filed: Nov. 29, 2017

(51) Int. Cl.
  *H04L 9/08* (2006.01)
  *H04L 9/06* (2006.01)

(52) U.S. Cl.
  CPC ........... *H04L 9/0877* (2013.01); *H04L 9/06* (2013.01); *H04L 9/0838* (2013.01); *H04L 9/0869* (2013.01)

(58) Field of Classification Search
  None
  See application file for complete search history.

(56) References Cited

U.S. PATENT DOCUMENTS

| | | | |
|---|---|---|---|
| 7,802,111 B1 * | 9/2010 | Tahan | G06F 21/57 380/259 |
| 9,407,437 B1 * | 8/2016 | Campagna | H04L 9/14 |
| 2003/0074548 A1 | 4/2003 | Cromer et al. | |
| 2005/0138393 A1 * | 6/2005 | Challener | G06F 21/6218 713/186 |
| 2006/0010326 A1 * | 1/2006 | Bade | G06F 21/572 713/176 |
| 2006/0074600 A1 | 4/2006 | Sastry et al. | |
| 2006/0155988 A1 * | 7/2006 | Hunter | G06F 21/575 713/164 |
| 2007/0073416 A1 * | 3/2007 | Grawrock | G06F 21/57 700/1 |
| 2008/0059799 A1 * | 3/2008 | Scarlata | H04L 9/0897 713/176 |
| 2009/0070598 A1 * | 3/2009 | Cromer | G06F 21/575 713/193 |
| 2009/0086979 A1 | 4/2009 | Brutch et al. | |
| 2009/0205044 A1 * | 8/2009 | Challener | G06F 21/552 726/22 |

(Continued)

OTHER PUBLICATIONS

Trusted Computing Group, "TCG Infrastructure Working Group A CMC Profile for AIK Certificate Enrollment", TCG Published, Copyright 2006-2011, Version 1.0, Mar. 24, 2011, pp. 1-72.

(Continued)

*Primary Examiner* — Arezoo Sherkat
(74) *Attorney, Agent, or Firm* — Robert C. Kowert; Kowert, Hood, Munyon, Rankin & Goetzel, P.C.

(57) ABSTRACT

Disclosed systems and methods implement a tracking system that tracks accesses to a TPM-secured key. In embodiments, the key may be encrypted using an encryption key, which is sealed using the TPM. A first value indicating an initial access state of the key is stored in a PCR of the TPM, and the encryption key is sealed against the PCR, so that it can be unsealed when contents of PCR match a next value derived from the first value. When the key is accessed, contents of the PCR is verified against an expected access state. If successfully verified, the PCR is extended hold the next value, the encryption key is unsealed, and the key decrypted. With each access, the encryption key is repeatedly resealed against the successive states stored in PCR. In this manner, the PCR may be used to track accesses and detect unauthorized accesses to the key.

20 Claims, 11 Drawing Sheets

(56) References Cited

U.S. PATENT DOCUMENTS

| | | | | |
|---|---|---|---|---|
| 2010/0082991 A1* | 4/2010 | Baldwin | ........... | H04L 9/083 713/176 |
| 2010/0268967 A1* | 10/2010 | Senda | ........... | G06F 21/575 713/193 |
| 2011/0185165 A1* | 7/2011 | Haga | ........... | G06F 21/57 713/2 |
| 2011/0213953 A1* | 9/2011 | Challener | ........... | G06F 21/57 713/2 |
| 2012/0110644 A1* | 5/2012 | Thom | ........... | G06F 21/57 726/4 |
| 2012/0297175 A1* | 11/2012 | Ekberg | ........... | G06F 21/575 713/1 |
| 2015/0261950 A1* | 9/2015 | Schulz | ........... | G06F 21/51 726/22 |
| 2015/0318998 A1* | 11/2015 | Erlikhman | ........... | H04L 9/0863 713/171 |
| 2016/0147996 A1* | 5/2016 | Martinez | ........... | G06F 21/572 713/2 |
| 2017/0010881 A1* | 1/2017 | Kawazu | ........... | G06F 8/65 |

OTHER PUBLICATIONS

Trusted Computing Group, "TCG Infrastructure WG CMC Profile for EK/Platform Certificate Enrollment for TPMv1.2", TCG Published, Copyrigt 2013, Specification Version 1.0, Apr. 3, 2013, pp. 1-46.

Trusted Computing Group, "Attestation Identity Key (AIK) Certificate Enrollment Specification Frequently Asked Questions Sep. 2011", pp. 1-2.

Trusted Computing Group, "TPM Main Part 1 Design Principles", Specification Version 1.2, Revision 116, TCG Published, Copyright 2003-2011, Mar. 1, 2011, pp. 1-184.

Trusted Computing Group, "TPM Main Part 2 TPM Structures", Specification Version 1.2, Level 2 Revision 116, TCG Published, Copyright 2003-2011, Mar. 1, 2011, pp. 1-201.

Trusted Computing Group, "TPM Main Part 3 Commands", Specification Version 1.2, Level 2Revision 116, TCG Published, Copyright 2003-2011, pp. 1-339.

\* cited by examiner

KEY USAGE TRACKING USING TPM

BACKGROUND

Many companies and other organizations operate computer networks that interconnect computing systems to support their operations. In particular, public data centers housing significant numbers of interconnected computing systems have become commonplace. As these public data centers emerge in the marketplace, use of various hardware security systems such as trusted platform modules or TPMs have also gained more prominence. TPMs, in particular, are designed provide trusted information about a piece of computer hardware (e.g., via a TPM quote) which may be used to verify the hardware before it is used.

The protection of keys is a generally difficult problem. TPMs provide a secure mechanism to protect keys by sealing the key against the TPM's platform configuration registers (PCRs). Basically, the key can only be extracted when the TPM measurements recorded by the platform's secure boot sequence match the extracted values. In some cases, by unsealing fairly early in the boot process, the chances of compromising the key can be minimized.

Figure 1:
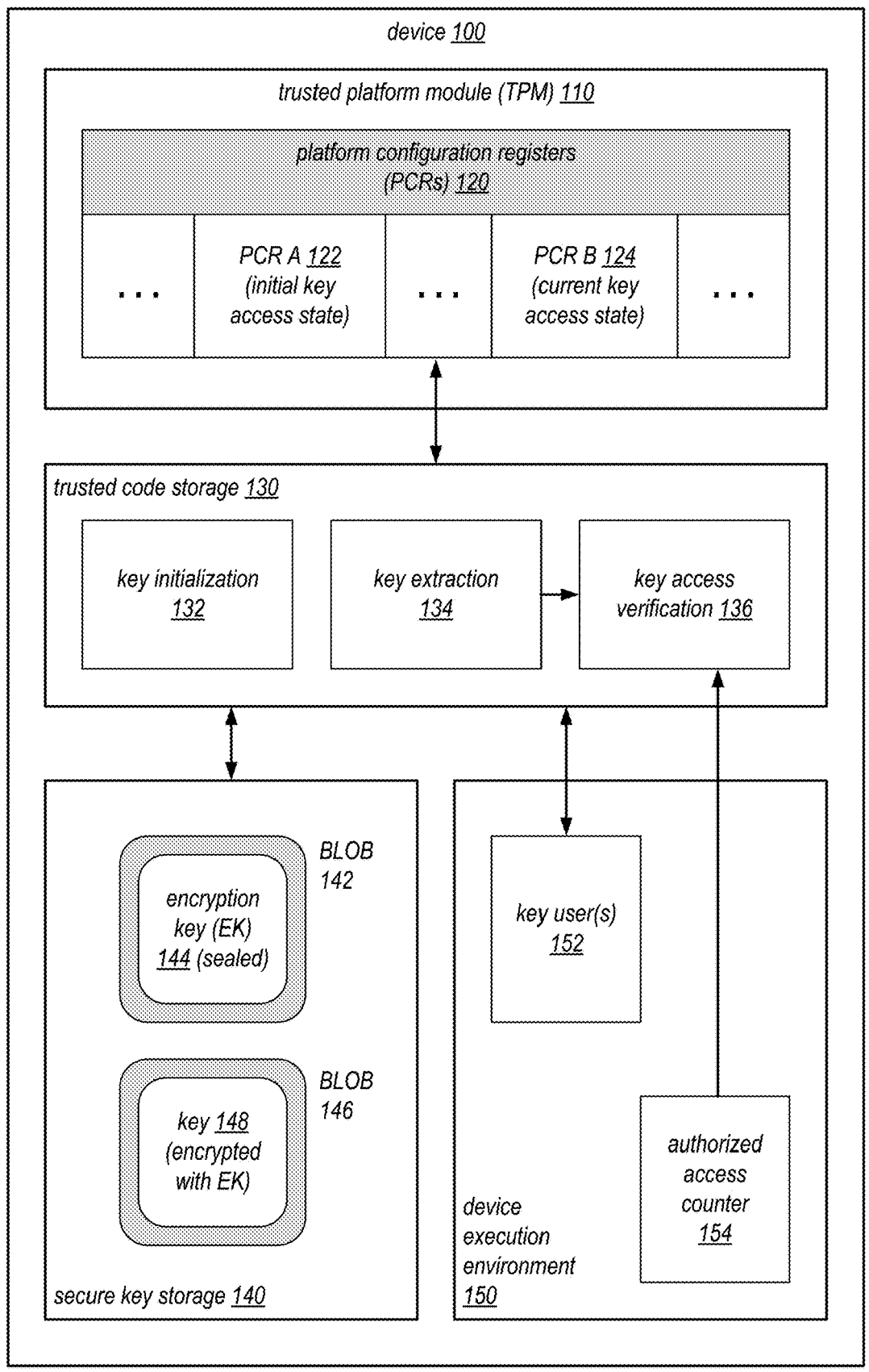
FIG. 1 is a block diagram illustrating an example device that tracks usage of a key using a TPM, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in embodiments to implement a device that tracks usage of a key using a trusted platform module (TPM). Combinations of the components and techniques described herein improve the functioning of TPM-based systems as described below, to permit tracking of a repeat-use key or other data item via the TPM.

Use of TPMs in computer systems are becoming more common. A TPM is a security module that is coupled to a piece of computer hardware (e.g., a motherboard, a peripheral component, etc.), and may be used to perform certain security functions for the computer system. For example, the TPM may provide trusted information about the computer hardware (e.g., via a TPM quote), which may be used to programmatically verify the identity and configuration of the hardware before it is used. Some of the functionality of the TPM may be defined in standards, such as standards disseminated by the standardization body Trusted Computing Group (TCG).

The protection of keys is a generally difficult problem. TPMs provide a secure mechanism to protect keys and other data items by sealing the data against the TPM's platform configuration registers (PCRs). For example, in some embodiments, the key can only be extracted when the TPM measurements recorded by the platform's secure boot sequence match the extracted values. In some embodiments, by unsealing fairly early in the boot process, the chances of compromising the key can be minimized. However, the real conundrum of key protection is safeguarding the key following its extraction from the TPM. While it is trivial to erase the key from memory following a one-time use, many use cases (such as systems that launch multiple operating system instances using kexec) require repeated access to the original key. In these situations, making the original key available in its plain form is clearly undesirable, but re-encrypting the original key with another symmetric or asymmetric key merely adds a layer of obfuscation and is not a good solution.

Accordingly, systems and methods are disclosed herein to the TPM to provide a key or data protection solution that is tamper-evident, to allow usage of repeat-use keys or data items to be tracked using the TPM. In some embodiments, a key to be tracked may be encrypted using an encryption key, which is in turn sealed using the TPM. A first value indicating an initial access state of the key is stored in a PCR of the TPM, and the encryption key is sealed against the PCR, so that it can be unsealed when contents of PCR match a next value derived from the first value. In some embodiments, when the tracked key is accessed, contents of the PCR is verified against an expected access state. If the verification is successful, the PCR is extended hold the next value, the encryption key is unsealed, and the key decrypted.

In some embodiments, with each access, the encryption key is repeatedly resealed against the successive states stored in PCR. In this manner, the PCR may be used to track accesses and detect unauthorized accesses to the key. These and other features and benefits of the TPM-based key usage tracking system are described in further detail below, in connection with the figures.

FIG. 1 is a block diagram illustrating an example device that tracks usage of a key using a TPM, according to some embodiments. As shown, the figure depicts an embodiment of a device 100 that includes a trust platform module (TPM) 110. The device 100 may comprise a variety of computer devices, such as for example a computer, a mobile computer, a smart phone, a peripheral device such as a daughter card or a dongle, which may implement different functionality in hardware such as a data storage or network communications, among other things.

The TPM 110 may be a security device that is coupled to the device 100. In some embodiments, when enabled, the TPM 110 may provide a set of security functions for the device to make the device into a "trusted platform." For example, in some embodiments, the TPM 110 may implement a set of security functions that provide some degree of assurance to other entities interacting with the trusted platform that the trusted platform is indeed what it purports to be, and that the trusted platform will behave in the way that the entity expects it to. In some embodiments, the TPM 110 may provide security features such as protected capabilities, integrity measurement, and integrity reporting. In some embodiments, the TPM 110 may also provide features such as confidentiality and integrity protection, secure storage, and process isolation. In some embodiments, some of the functionality of the TPM may be defined in standards, such as standards disseminated by the standardization body Trusted Computing Group (TCG).

Depending on the embodiment, the TPM 110 may include a number of different components. In some embodiments, the TPM 110 may implement an input/output interface, which may implement a serialization transformation function that allows incoming data to be transported to a bus or other type of interconnect connecting components within the TPM. In some embodiments, the I/O interface may also manage information flow between components within the TPM and an external bus connecting the TPM to the device 100. In some embodiments, the I/O interface may be configured to control access to the various TPM components. Access to the components may be configured via an opt-in module on the TPM 110.

In some embodiments, the TPM 110 may include an execution engine, which may be configured to run program code stored in the TPM. In some embodiment, the execution engine may be configured to respond to external commands by selecting appropriate program code to execute. In some embodiments, the program code may be stored as firmware within the TPM 110. In some embodiments, the program code may be used to initialize the TPM 110. In some embodiments, at least some of the initialization functionality may be implemented in other firmware such as the BIOS boot block.

As shown, in some embodiments, the TPM 110 may include a random number generator. In some embodiments, the random number generator may provide a source of entropy to components within the TPM 110 or other entities. In some embodiments, the random number generator may generate a random set of bits in a non-deterministic manner. In some embodiments, the random numbers generated by the random number generator may be used to generate cryptographic keys, nonces, and other random data.

In some embodiments, the TPM 110 may include a hash generator. In some embodiments, the hash generator may implement an algorithm to hash input data to produce a fixed length digest. In some embodiments, the algorithm may be a version of the Secure Hash Algorithm SHA-1. The hash generator may be used in a number of functions performed by the TPM 110, for example in the computation of digital signatures and for extending values in the PCR registers 120.

In some embodiments, the TPM 110 may include a key generator. In some embodiments, because the generation of cryptographic key may be computationally intensive, the TPM 110 may implement a dedicated module to perform this task. For example, the TCG standard specifies that the TPM should include a key generation module that supports keys of a 2048-bit modulus. In some embodiments, some keys may be allowed to have a smaller modulus, depending on their use.

In some embodiments, the TPM 110 may include an RSA engine. The execution of the Rivest-Shamir-Adleman (RSA) algorithm in a computationally complex task, and so in some embodiments, a dedicated module may be provided for the execution of the algorithm itself. The RSA algorithm is used for signing, encryption, and decryption operations using public-private key pairs. In some embodiments, the TPM 110 may maintain the principle of key separation. In some embodiments, the TPM may use dedicated signing keys for signing data, and separate storage key pairs for encryption and decryption.

As shown, in some embodiments, the TPM 110 may include set of platform configuration registers (PCRs) 120. In some embodiments, the PCRs may be used to store integrity metrics of the device 100, as measured by the TPM 110. The integrity metrics stored in the PCRs 120 measure the integrity of any code, from BIOS to applications. In some embodiments, the measurements may be performed before the code is executed. The PCRs may be implemented in volatile or non-volatile storage. In some embodiments, the TPM 110 may have 16 or more PCRs 120 that each store 20 bytes. In some embodiments, PCR registers 0 to 7 are reserved for exclusive use by the TPM 110, and the remaining registers are free for use by the operating system and other applications.

In some embodiments, the device 100 may implement one or more applications that can provide attestations of the device 100 to other entities. In some embodiments, the attestations may be provided to software entities executing on the device 100 itself. In some embodiments, the attestations may be provided to remote entities. The attestation mechanism may be used to provide an integrity report of the device 100, before the device 100 is used to perform certain protected operations. In some embodiments, the contents of the PCR registers 120 are provided in an attestation, via a TPM quote. The TPM quote may be signed by an attestation identity key (AIK) of the TPM 110. Thus, a requesting entity that has possession of the public AIK may use the public key to verify the source of the attestation.

In some embodiments, the TPM 110 may include volatile memory. As discussed, in some embodiments, the volatile memory 131 may be used to store the PCRs 120. In some embodiments, the volatile memory may be used to store other dynamic data items, such as for example intermediate values computed by other components of the TPM 110.

In some embodiments, the TPM 110 may include a non-volatile memory. In some embodiments, the non-volatile memory may be used to implement a secure data store resident on the TPM 110, which may be used to long-term store data persistent across reboots of the device 100. In some embodiments, the non-volatile memory may be implemented using non-volatile random-access memory (NVRAM). In some embodiments, the non-volatile memory may store an endorsement key for the TPM 110. The endorsement key may be a manufacturer-supplied key that uniquely identifies the TPM. In some embodiments, the non-volatile memory may store a storage root key (SRK) for the TPM 110. In some embodiments, the SRK is not supplied by the TPM's manufacturer, but created during the process of taking ownership of the TPM 110. The SRK may form the root of a key hierarchy used to provide secure storage and, as with the endorsement key, never leaves the TPM 110. The key hierarchy allows keys to be encrypted by its parent key(s), so that they can only be decrypted by accessing the TPM 110.

As shown, in some embodiments, the device 100 may implement a trusted code storage 130. The trusted code storage may be a non-volatile storage that stores a trusted code base (TCB), which may be part of a software stack that can directly interface with the TPM 110 to provide security services for the platform associated with the TPM (e.g., the device 100). In some embodiments, the trusted code base 130 may be stored in a storage area on a non-volatile storage such as erasable programmable read-only memory (EPROM) or electrically erasable programmable read-only memory (EEPROM). In some embodiments, the TCB 130 may store different software modules that perform TPM-relates software functions, such as the key initialization module 132, key extraction module 134, and key access verification module 136, as shown.

In some embodiments, the TCB 130 may include software that implements a secure boot process of the device 100. In some embodiments, the secure boot sequence may use to TPM to measure various operating states during the booting of the device 100 and store those measurements in the PCRs 120. In some embodiments, some of the measurements may be performed by the firmware of the device 100.

In some embodiments, a key or other data may be established prior to or during the secure boot process, such as for example key 148. In some embodiments, the key 148 may be a repeat-use key. Depending on the embodiment, the key 148 may be used for different purposes. For example, in some embodiments, the key may allow the keyholder to use the device 100. In some embodiments, the key may allow the keyholder to access a storage area or device. For example, in some embodiments, the key 148 may be a volume key that is needed to read and write data in an encrypted volume. The key 148 may need to be obtained by an instance of the operating system to access the file system, for example, and may be needed by multiple instances of the operating system on the device.

In some embodiments, following the secure boot process, the key 148 may be sealed via contents of the PCR 120, so that the key can only be unsealed if the contents of the PCRs 120 reflect a set of expected boot sequence states of the hardware. Thus, any users of the key 148 can be assured that the unsealed key came from a platform that can be trusted. In some embodiments, following the unsealing of the key, control may be transferred from the firmware of the device 100 to the key initializer 132. In some embodiments, the key initializer 132 may extend the PCRs 120 with another measurement, so as to ensure that the key cannot be extracted again using the measurements with which it was sealed. In some embodiments, the key initializer 132 may perform a variety of other initialization operations, such as for example taking ownership of the TPM 110, or establishing the storage root key (SRK) of the TPM 110.

In some embodiments, the key initializer 132 may perform a re-encryption of the key 148 extracted following the secure boot sequence. As discussed, in some embodiments, the key 148 may be a volume key that is needed to read from and write to an encrypted volume. In some embodiments, such a key may be accessed multiple times by multiple instances of operating systems, which may be launched via programs such as kexec.

In some embodiments, key initializer 132 may generate a new encryption key, for example a symmetric key. The encryption key may 144 be generated in a random or pseudorandom manner. In some embodiments, the encryption key 144 may be generated by the TPM 110, or using an entropy value obtained from the TPM. In some embodiments, the key 148 to be tracked is then encrypted by the encryption key. In some embodiments, the key 148 may also be encrypted by the TPM's SRK. In some embodiments, the encryption of the key 148 may create a binary large object (BLOB) 146, which may then be stored by the device 100.

In some embodiments, as shown, the BLOB 146 may be stored on a secure key storage 140 which is controlled by the TCB 130 using the TPM 110. As discussed, in some embodiments, the TCB may provide a secure storage service to store different types of trusted data associated with the platform or device 100. Such secure data may be stored off of the TPM, in the secure key storage 140. However, in some embodiments, the key 148 may be stored on the TPM 110 itself, for example in the TPM's volatile or non-volatile storage. In some embodiments, the secure key storage may be a volatile storage area on the device 100, which stores multiple keys that are controlled via the TPM 110. In some embodiments, all such keys may be encrypted by at least the SRK of the TPM.

In some embodiments, the initializer 132 may update PCRs in the set of PCRs 120 of the TPM. As shown, in some embodiments, the initializer 132 may update two PCRs, PCR A 122 and PCR B 124. However, in some embodiments, only PCR B 124 may be used. In some embodiments, the initial value is obtained to be used as an initial access state of the key 148, before any access attempts. In some embodiments, PCR A 122 may be extended to hold the initial value. In addition, in some embodiments, the initializer 132 may extend PCR B 124 with the same initial value. In some embodiments, the contents of PCR A 122 may not change with repeated accesses to the key 148. In some embodiments, the contents of PCR A 122 may remain constant until the next boot of the device 100.

In some embodiments, the contents of PCR B 124 may be updated with each access of the key 148. The update may monotonically increment the access state of the key 148 stored in PCR B 124 in a deterministic manner, so that the content of PCR B 124 may be later used to determine the number of times that the key 148 has been accessed. In some embodiments, the update of PCR B 124 may be performed using a deterministic derivation function that can be repeatedly applied to the contents of PCR B 124. For example, in some embodiments, the derivation function may implement $T_{i+1}=\text{SHA-1}(T_i\|C)$, where $T_i$ is the a first key access state for the key stored in PCR B, $T_{i+1}$ is the next key access state obtained using the derivation function, C is some constant that is appended to and SHA-1 is the cryptographic hash function Secure Hash Algorithm 1. In some embodiments, other hash functions may be used, for example, SHA-2 or SHA-3. In some embodiments, the constant C may be zero. In some embodiments, the derivation function may be implemented via the extend operation of the TPM. Thus, by repeatedly extending the constant C into PCR B, the contents of PCR B are updated according to the derivation function.

In some embodiments, the initial value $T_0$ may be generated randomly or pseudo-randomly. In some embodiments, To may be generated using the TPM 110, or via an entropy obtained from the TPM. In some embodiments, the may be a preexisting value of the TPM, for example, the existing SRK of the TPM. Thus, in some embodiments, the initial value $T_0$ may simply be assumed by the initializer 132 and other components of the TCB 130, and thus, PCR A 122 may not be needed.

In some embodiments, the encryption key (EK) 144 used to encrypt the key 148 is then sealed with a seal operation of the TPM 110. In some embodiments, the EK 144 may first be wrapped or encrypted with the SRK of the TPM. In some embodiments, the EK 144 may be sealed against the PCR B 124, such that an unsealing of the EK 144 can succeed when the contents of PCR B matches the next key access state derived by the derivation function. In other words, if the current contents of PCR B indicate the seal operation may specify that the unsealing requires the contents of PCR B to be the next derivative value $T_{i+1}$. As shown, the sealing operation may produce a second BLOB 142. In some embodiments, this second BLOB 142 is also stored in the secure key storage 140 managed by the TCB 130.

In some embodiments, the TCB 130 may implement a key extraction module 134, or some other key access module, that either uses the key 148 or provides the key 148 to other entities, such as key users 152, which may execute in the device execution environment 150, as shown. The execution environment may comprise one or more processors of the device 100 and runtime memory (e.g. RAM) hosting the key users 152. In some embodiments, the key users may be different instances of operating system kernels, launched for example via kexec. In some embodiments, the key users may be different instances virtual machines running on the device 100, which may be a virtualization host. In some embodiments, these kernel instances may request the key 148, which may be a volume key needed to decrypt contents of a storage volume used by the instance. As may be appreciated by those skilled in the art, the key users 152 may include a variety of entities. In some embodiments, the key users 152 may be remote entities that are not executing on the device 100. The key extractor 134 may receive requests from key users 152 to use or access the key 148.

In some embodiments, to access the key 148, the key extractor 134 may update PCR B with the next key access state so that the unsealing condition for the encryption key 144 is satisfied. After the contents of PCR B 124 is properly updated, the encryption key 144 may be unsealed using the unseal operation of the TPM 110. In some embodiments, the updating of PCR B 124 may be performed via an extend operation of PCR B, to extend the constant C of the derivation function (e.g. 0) into PCR B. After the EK 144 is unsealed, the BLOB containing the key 148 may then be loaded from the secure key storage 140 and then decrypted using the EK. In some embodiments, the key 148 may be used to perform a specified task by the TCB 130, In some embodiments, the TCB 130 may simply provide the key 148 to the key user 152 who requested the key.

In some embodiments, in response to a key access, the key extractor 134 may cause the EK 144 to be resealed. In some embodiments, a new EK may be generated in a similar manner that generated the previous EK 144, and the key 148 may be encrypted using the new EK and stored in the secure key storage 140. In some embodiments, the EK 144 or new EK will be resealed against the PCR B 124, to be unsealed based on the next key access state value to be generated by the derivation function. Thus, at the next key access, the key extractor 134 will again compute the next key access state, extend that value into PCR B to unseal the EK, and then decrypt the key 148. As may be understood, this process essentially captures a count of the number of derivations in PCR B 124. In some embodiments, this count may be used, in conjunction with the initial key access state value in PCR A 122, to determine the number of times that the key 148 has been accessed. In some embodiments, the arrangement may also be used track accesses to key 148 or detect an unauthorized access of the key 148.

In some embodiments, the TCB 130 may implement a key usage reporter, which may interface with a control plane system or some other monitoring entity to communicate the access count of the key 148, as seen by the TPM. In some embodiments, the key usage reporter may compute the key access count from the contents of PCR B 124 and PCR A 122. In some embodiments, the monitoring entity may simply obtain the contents of PCR A and/or PCR B via a standard TPM quote, and so that it can compute the key access count by itself. In some embodiments, the monitoring functionality may be performed by the key users 152, so that the key user 152 may verify the key access count at each access. If an unexpected value is observed, or if an unauthorized access is detected or suspected from the value, the monitor may raise an alarm or cause corrective action to be taken.

In some embodiments, as shown, the TCB 130 may implement a key access verification module 136, which may perform a verification to determine whether an unauthorized access of the key 148 has occurred. In some embodiments, as shown, the key access verification 136 may be performed as part of the key extraction 134. Thus, in some embodiments, each access of the key 148 may be accompanied by the verification.

In some embodiments, the verification may entail comparing the current access state of the key (e.g., in PCR B), against an authorized key access count obtained from another entity, e.g., an authorized access counter 154, as shown. In some embodiments, the authorized access counter 154 may be a program running on the device 100 within the execution environment 150. In some embodiments, the authorized access counter 154 may be a remote entity, such as a separate control plane system. The authorized access counter 154 may maintain an authorized access count of the key 140 in a variety of ways. For example, in some embodiments, each authorized key user may only obtain the key once, and all authorized key users may be authorized by, authenticated by, or registered with the authorized access counter 154. In some embodiments, the authorized access counter 154 may provide the authorized access count to the TCB 130, via one or more programmatic calls to update the state of the TCB. In some embodiments, the access count maintained by the authorized access counter 154 may be taken as a measurement by the TCB.

After the TCB learns of the authorized access count for the key 148, the key access verification module 136 may compare the current access state stored in PCR B against the authorized access count. In some embodiments, the seen count in the TPM may be computed by the verification module 136 using the contents of PCR A, PCR B, and repeated applications of the derivation function. In some embodiments, if the resulting value does not match the expected access count (e.g., the authorized access count), an alarm may be raised. In some embodiments, the alarm may be logged, and cause a current state of the TPM and TCB to be dumped, so that it can be examined. In some embodiments, the alarm may be programmatically sent to other components of the device, which may cause corrective action to be taken. For example, one or more key users 152 to be isolated or shut down. In some embodiments, an administrator may be alerted. In some embodiments, a verification failure may cause the key extraction operation to fail, and all subsequent key accesses to fail.

Figure 2:
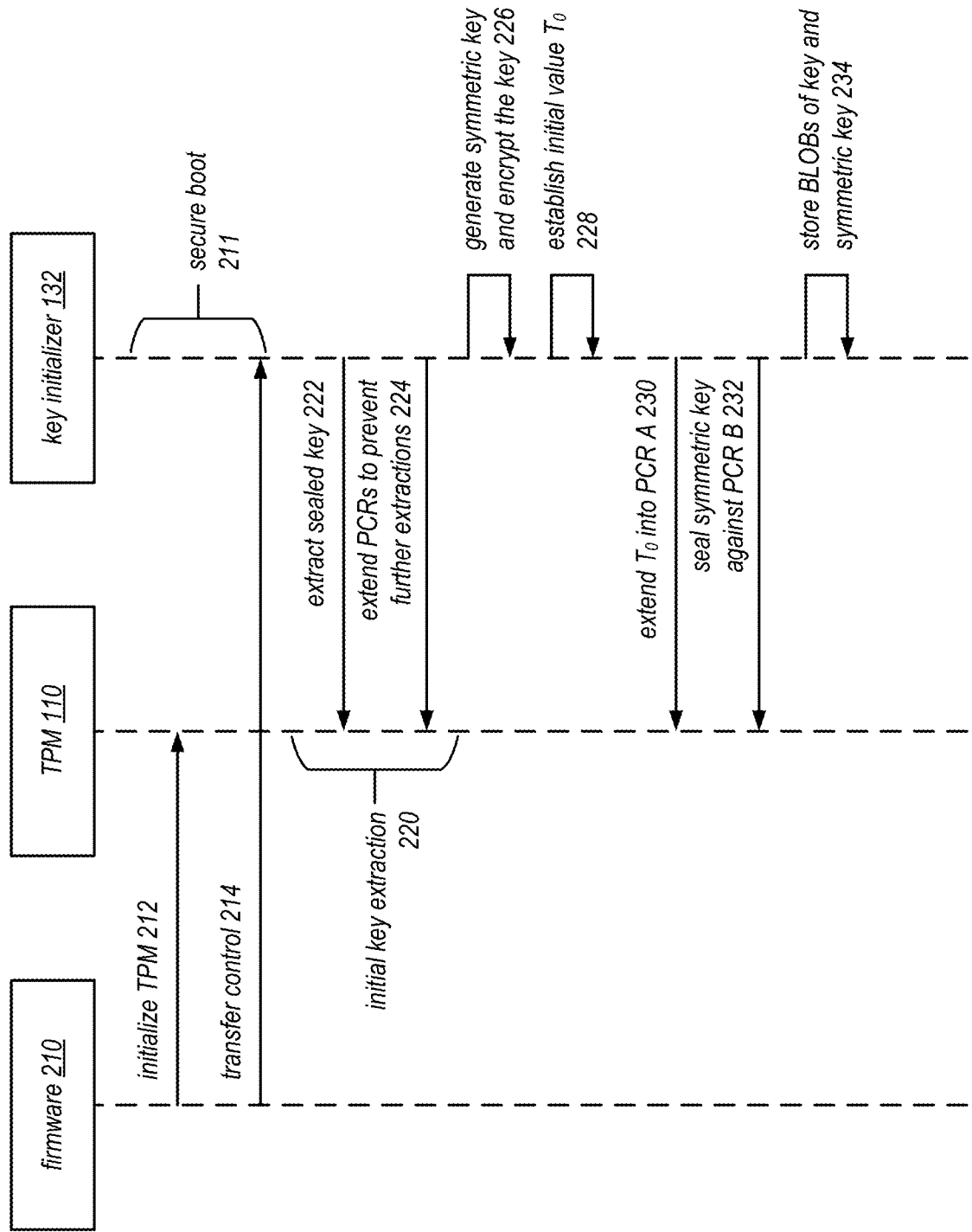
FIG. 2 is a system sequence diagram illustrating interactions between entities and components of a device to initialize usage tracking for a key using a TPM, according to some embodiments.

FIG. 2 is a system sequence diagram illustrating interactions between entities and components of a device to initialize usage tracking for a key using a TPM, according to some embodiments.

As shown, the process starts at interaction 212, where the firmware 210 initializes the TPM 110. The firmware 210 may be, for example, the firmware controlling the boot process of the device 100. In some embodiments, the initialization may perform a reset operation implemented by the TPM 110, which may reset all configurations of the TPM 110 back to the factory default settings. In some embodiments, the initialization may create the storage root key (SRK) of the TPM 110. In some embodiments, the initialization may measure a sequence of states of the device during a secure boot process 211, and record these states in the PCRs 120 of the device. In some embodiments, the protect key 148 of the device (e.g., a volume key) may be sealed against an expected value of the PCRs 120, so that it can only be obtained if the device boots according to a known boot sequence and with a known set of components and configurations.

In some embodiments, following the initialization of the TPM, the process may proceed to interaction 214, where control is transferred from the firmware 210 to the key initializer 132. In some embodiments, the key initializer 132 may be stored outside of the TPM 110 itself, for example in a trusted code base (TCB) 130 on the platform that is coupled to the TPM.

As shown, once the key initializer 132 receives control, the key initializer may go through a key extraction process 220 to extract the sealed key. The process may include an extraction interaction 222 to extract the key from the TPM. In some embodiments, the extraction may be performed via an unseal operation, which can only succeed if the seal condition is met. The seal condition may require that the measured contents of the PCRs 120 match an expected set of measurements known to be the correct values for the device, before providing the sealed key.

As shown, in some embodiments, at interaction 224, the key initializer 132 may extend the PCRs 120 to prevent further extractions of the sealed key. Thus, for example, the key initializer may simply extend one of the PCRs specified in the unseal condition with a dummy value. This extension may prevent later entities from again unsealing the key using the initial extraction process 220, thus making process 220 a one-time process.

As shown, at interaction 226, a symmetric key is generated as the encryption key (e.g., EK 144), and the key (e.g. key 148) is encrypted using the symmetric key. In some embodiments, the encryption key may be an asymmetric key. In some embodiments, the encryption key may be generated using the TPM, for example, using the key generation modules of the TPM or an entropy generated by the TPM. In some embodiments, the encryption key may simply be the SRK of the TPM.

At shown, at interaction 228, an initial value $T_0$ is established. In some embodiments, this value is used to represent an initial key access state of the key, and is incremented or updated with each successive access of the key to generate subsequent key access states. In some embodiments, the initial value $T_0$ may simply be a constant or a randomly determined value from the TPM, for example, an entropy value generated by the TPM. In some embodiments, the initial value may be an identifier that is associated with the lifetime of the key.

As shown, at interaction 230, the initial value $T_0$ is extended to a PCR A of the TPM. In some embodiments, the previous contents of the PCR may be empty, or zero. In some embodiments, PCR A may store prior state information, for example parts of the boot sequence measurements, and the initial value is added to that information via an extend operation to PCR A. In some embodiments, multiple PCRs may be used to store the initial key access states of multiple keys whose access is to be traced. In some embodiments, the contents of PCR A may not be modified by subsequent accesses of the key. In some embodiments, PCR A may not be modified for the lifetime of the key. In some embodiments, the initial value $T_0$ may be a known or assumed value, such as for example an assumed constant or the SRK. In such embodiments, the value may not be stored, and thus use of PCR A may not be necessary.

As shown, at interaction 232, the symmetric or encryption key used to encrypt the tracked key is sealed. In some embodiments, the seal operation may be performed against another PCR, PCR B. The sealing may specify an unseal condition, such that the encryption key can be later unsealed if the contents of PCR B at that time matches a next value $T_1$ that is derived from the initial value $T_0$. In some embodiments, the derivation $T_0$ to $T_1$ may be implemented via a derivation function. In some embodiments, the derivation function may be based on the formula $T_{i+1}=SHA-1(T_i\|C)$, as discussed previously. In some embodiments, SHA-1 may be replaced with another hashing function. In some embodiments, the constant C may be zero.

As shown, at interaction 234, two BLOBs are stored. In some embodiments, the first BLOB is generated as a result of the encryption of the tracked key by the encryption or symmetric key. In some embodiments, the second BLOB is generated as a result of the sealing of the encryption or symmetric key. In some embodiments, both pieces of data may be further encrypted by other keys of the TPM 110, for example the SRK of the TPM. In some embodiments, the BLOBs may be stored in the TPM. In some embodiments, the BLOBs may be stored in a secure storage area that is managed by the TCB. For example, in some embodiments, the secure storage area may be the secure key storage 140 of FIG. 1.

Figure 3:
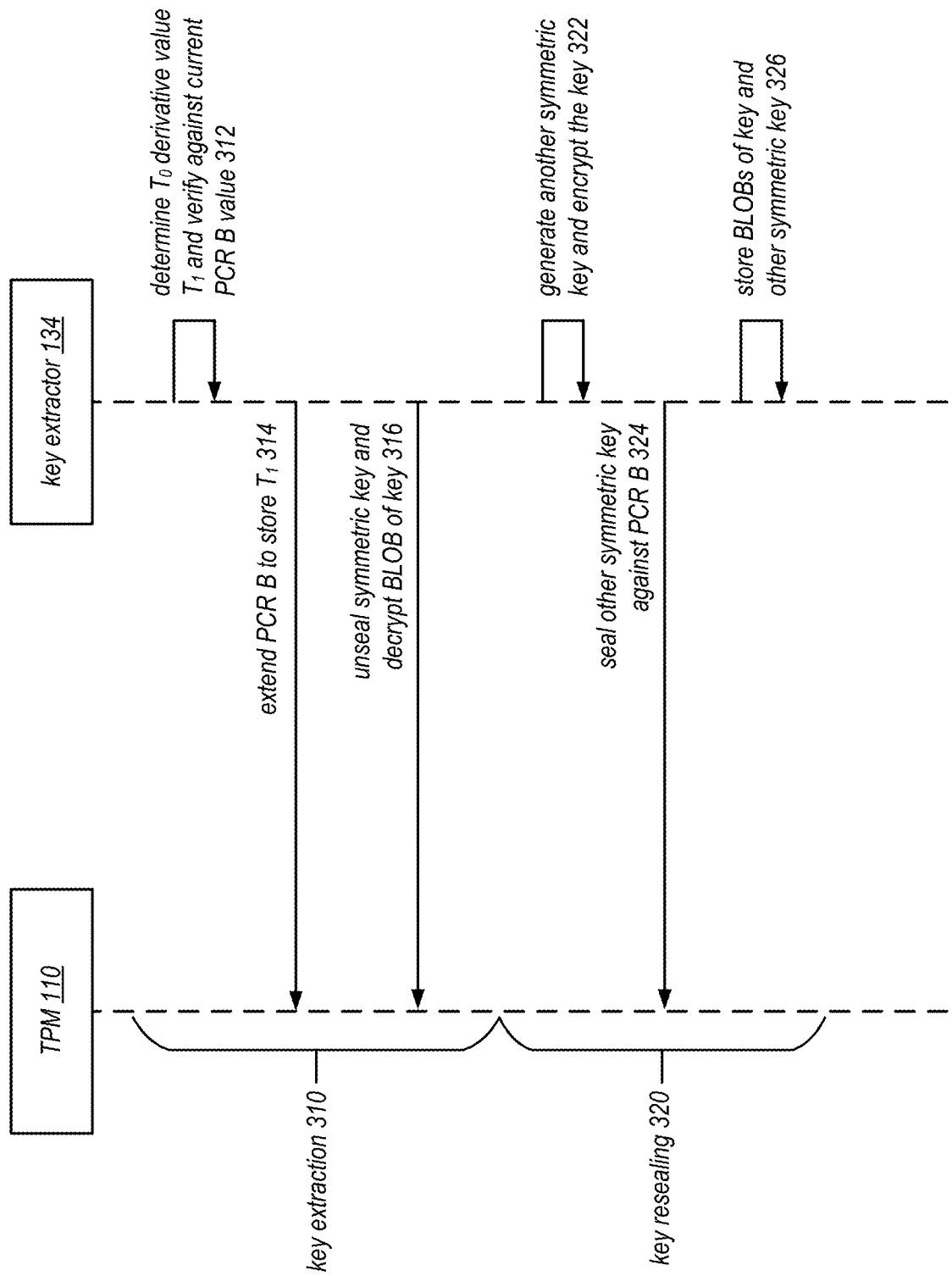
FIG. 3 is a system sequence diagram illustrating interactions between entities and components of a device to access a key under usage tracking, according to some embodiments.

FIG. 3 is a system sequence diagram illustrating interactions between entities and components of a device to access a key under usage tracking, according to some embodiments. In some embodiments, the sequence shown in FIG. 3 may be performed after the initialization process shown in FIG. 2. The process shown may be performed in response to a key access request from a key user or client to obtain or use the tracked key.

As shown, the sequence may be divided into two operations. In operation 310, the tracked key is extracted. In operation 320, a resealing process is performed to reseal the encryption key, which in some embodiments may be a newly generated encryption key. By using these two operations in combination, the process ensures that each access is accompanied by an update to the tracking PCR (e.g. PCR B) via the sealing mechanisms, thus keeping track of the key accesses.

In some embodiments, operations 310 and 320 may not always be performed in tandem. For example, in some embodiments, key resealing operation 320 may be performed following an authorization or authentication of the key user. In this manner, if an access is not authorized or authenticated, the key resealing operation 320 will not be performed. Accordingly, a subsequent key access will fail due to a mismatch of the contents of PCR B and the sealing condition. This mismatch may be detected as an unauthorized access of the key.

As shown, at interaction 312, a derivative value $T_1$ is determined from $T_0$. In some embodiments, the derivative value may be an expected access state that is computed from the contents of PCR A (To) and an authorized access count of the key, which may be obtained from an authorization entity, such as a control plane system or a monitoring entity. In some embodiments, a verification is performed to verify the contents of PCR B, which holds the current access state of the key, with the computed derivative value. In some embodiments, if the derived value of $T_0$ matches the computed value of $T_1$, then the verification is successful. In some embodiments, if there is a mismatch, this may indicate an unauthorized access of the key, and an error or alarm may be raised. In some embodiments, if the verification is not successful, the key access operation may fail.

If the verification is successful, at interaction 314, as shown, PCR B is extended with the derived value $T_1$. In some embodiments, the key extractor 134 may simply perform an extend call to the TPM to extend a constant specified by the derivation function to PCR B. In some embodiments, this extension causes PCR B to contain the derived value $T_1$, thus satisfying the unseal condition for the encryption key.

As shown, at interaction 316, the symmetric or encryption key is unsealed. The unseal may be performed via an unseal operation to the TPM, which succeeds because the unseal condition of PCR B is met. In some embodiments, the unseal condition may include other PCRs. In some embodiments, after the symmetric or encryption key is unsealed, it is used to decrypt the tracked key, as shown. The decrypted key may then be used or provided to the key user, according to the key access request. Because every access involves an unavoidable modification of PCR B, the register can be used to track all key accesses for the key.

As shown, at interaction 322, another symmetric key or encryption key may be generated, and the tracked key is again encrypted with the new encryption key. In some embodiments, this interaction may be skipped, and the old encryption key may be used again. However, regenerating the encryption key for every access provides added security to the process. For example, if an unauthorized entity was able to somehow obtain the encryption key, that entity may then be able to access the tracked key without detection. To avoid such a result, the encryption key may be regenerated upon every access, and the tracked key is always only obtainable by unsealing the encryption key.

As shown, at interaction 324, the other symmetric or encryption key is sealed against PCR B. Similar to the sealing operation performed during the initialization process, the encryption key is sealed so that it can be unsealed when contents of PCR B match the next value derived via the derivation function. Thus, with each access, the encryption key is resealed, and the contents of PCR B is updated to reflect the current key access state for the key.

As shown, at interaction 326, the BLOBs of the key and the other encryption or symmetric key is stored. This storing occurs for every access, and may be performed in similar fashion to the sealing process performed in the initialization process. Thus, in some embodiments, the BLOBs may be stored in the secure storage area associated with the TPM, and be encrypted using the SRK of the TPM.

FIGS. 4A to 4D illustrate example states of platform configuration registers of a TPM used to track the usage of a key, according to some embodiments.

Figure 4A:
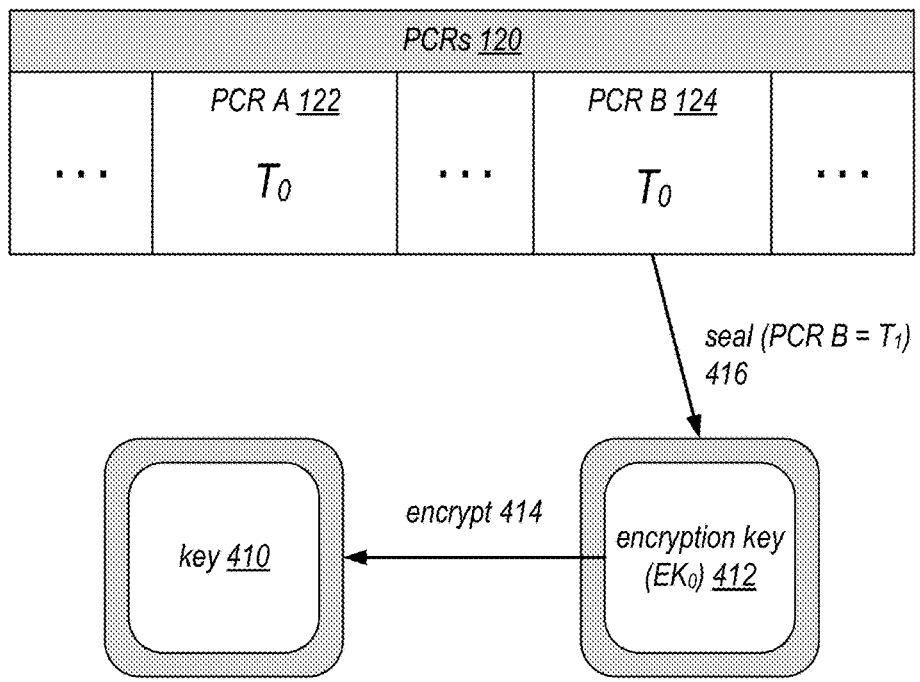
FIGS. 4A to 4D illustrate example states of platform configuration registers of a TPM used to track the usage of a key, according to some embodiments.

As shown, in FIG. 4A, key tracking has just been initialized for a key 410. As shown, PCR A 122 is populated with the initial value of $T_0$, which in some embodiments, will not change unless tracking is reset. In some embodiments, the initial value may be extended to PCR A 122, and combined with other existing values in PCR A. As shown, PCR B 124 is also populated with the initial value of $T_0$. In some embodiments, this may occur immediately after the initialization. In some embodiments, PCR B 124 may not be populated until the key is accessed for the first time. In some embodiments, when the values of the two PCRs 122 and 124 are the same, this indicates an access count of zero for the key 410.

As shown, in some embodiments, an encryption key 412 ($EK_0$) may be used to encrypt 414 the key 410. The encryption key itself may then be sealed 416 against PCR B 124, to be unsealed when the contents of PCR B is $T_1$. As discussed, this sealing may be performed via a sealing operation provided by the TPM, and implement a derivation function that takes $T_0$ to $T_1$. In some embodiments, the derivation function may implement the formula the formula $T_{i+1}=\text{SHA-1}(T_i\|C)$, which may be performed via an extension of the constant value C into PCR B.

Figure 4B:
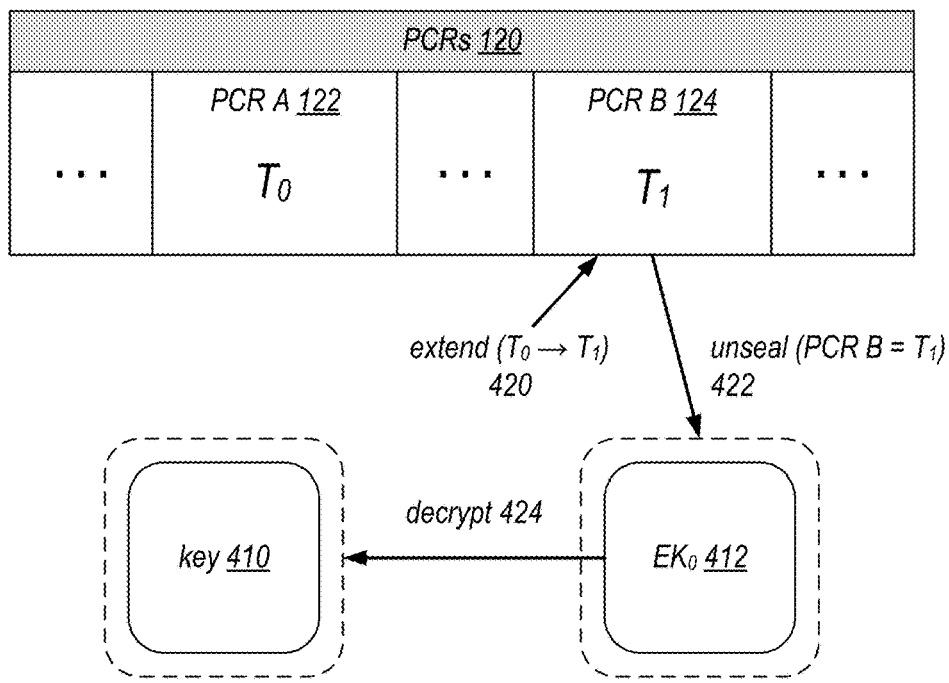

As shown, FIG. 4B illustrates changes in the tracking state in response to a key access request from a key user. As shown, in response to the key access request, an extend operation 420 may first be performed to change the contents of PCR B from $T_0$ to $T_1$. In some embodiments, the update may be performed by extending a constant C into PCR B 124. After the extension, the unseal condition for the encryption key 412 is satisfied. Accordingly, the encryption key 412 may be unsealed 422. The key 410, in turn, may be decrypted 424 using the encryption key 412. In some embodiments, the tracked key may be provided back to the requesting client. As seen, this key access may be performed using a number of native functions provided by TPM to update PCR B, which tracks the accesses to the key 410.

Figure 4C:
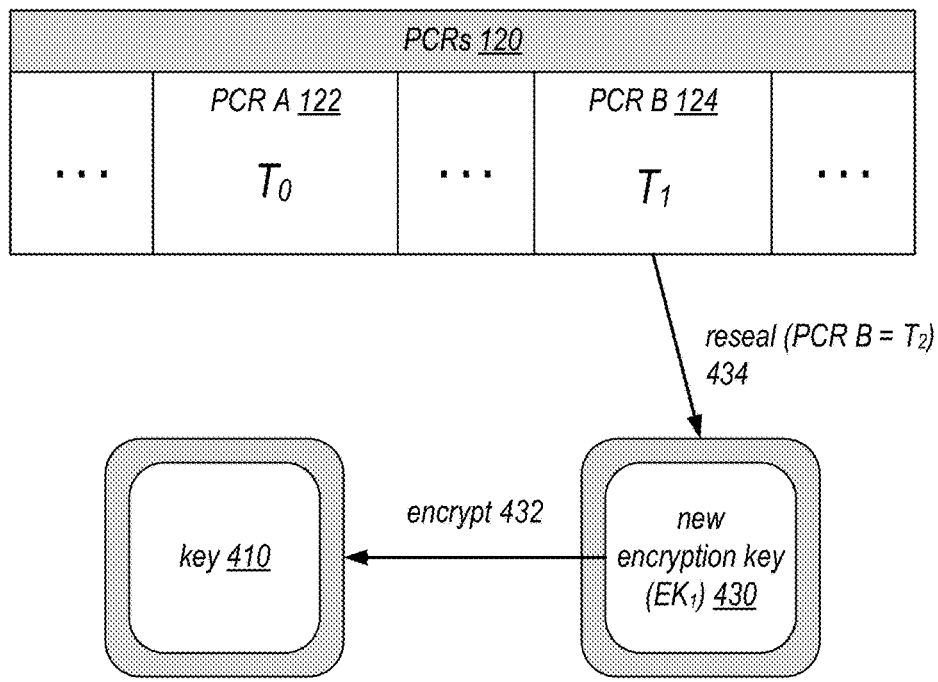

As shown, FIG. 4C illustrates a resealing process that may be performed after a key access. In some embodiments, the resealing may always be performed in conjunction with the updating of PCR B. In some embodiments, the resealing may be performed separately, so as to for example detect unauthorized key accesses.

As shown, in some embodiments, a new encryption key $EK_1$ 430 may be generated. The key 410 may be encrypted 432 using the new encryption key 430. The new encryption key 430 may then be resealed 434 against PCR B, so that it can be unsealed when the value of PCR B matches the next value derived using the derivation function (e.g., via another extension of the constant C). The resulting BLOBs from these operations may be stored in a secure storage area associated with the TPM. In some embodiments, earlier remnants of the key and encryption are replaced or deleted, so that the key 410 cannot be accessed in any other ways other than via an unsealing of the new encryption key 430.

Figure 4D:
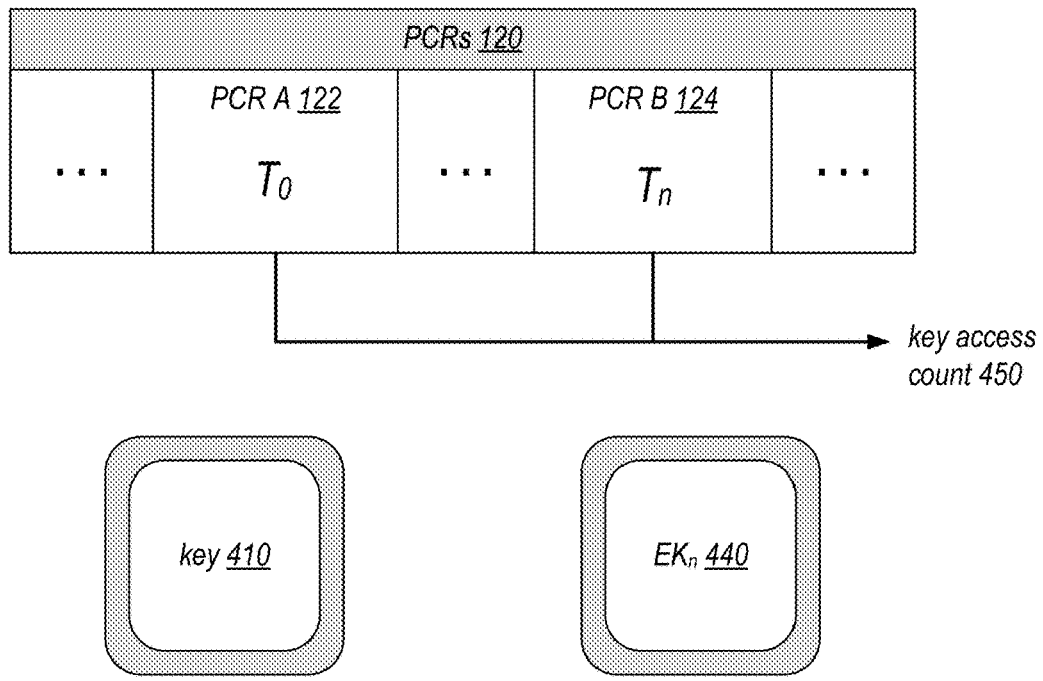

As shown, FIG. 4D illustrates the state of the PCRs and secure key storage after a number of accesses of the key 410. As shown, at that point, the key 410 may be encrypted by some other encryption key $EK_n$ 440, which is again sealed against PCR B. The current contents of PCR B 124 now indicate $T_n$, which is the access state after the key 410 has been accessed n times. Thus, the contents of PCR A 122 and PCR B 124 may be used to determine the key access count 450 of the key 410. In some embodiments, the derivation function may be implemented in a manner so that n is readily observable from $T_n$ to reflect the number of times that the key has been accessed. In some embodiments, the value of n may be determined by an iterative process, where the derivation function is repeatedly applied to the initial value $T_0$ until a result of $T_n$ is obtained. The number of application of the derivation function to achieve $T_n$ is thus the access count of the key 410.

Figure 5:
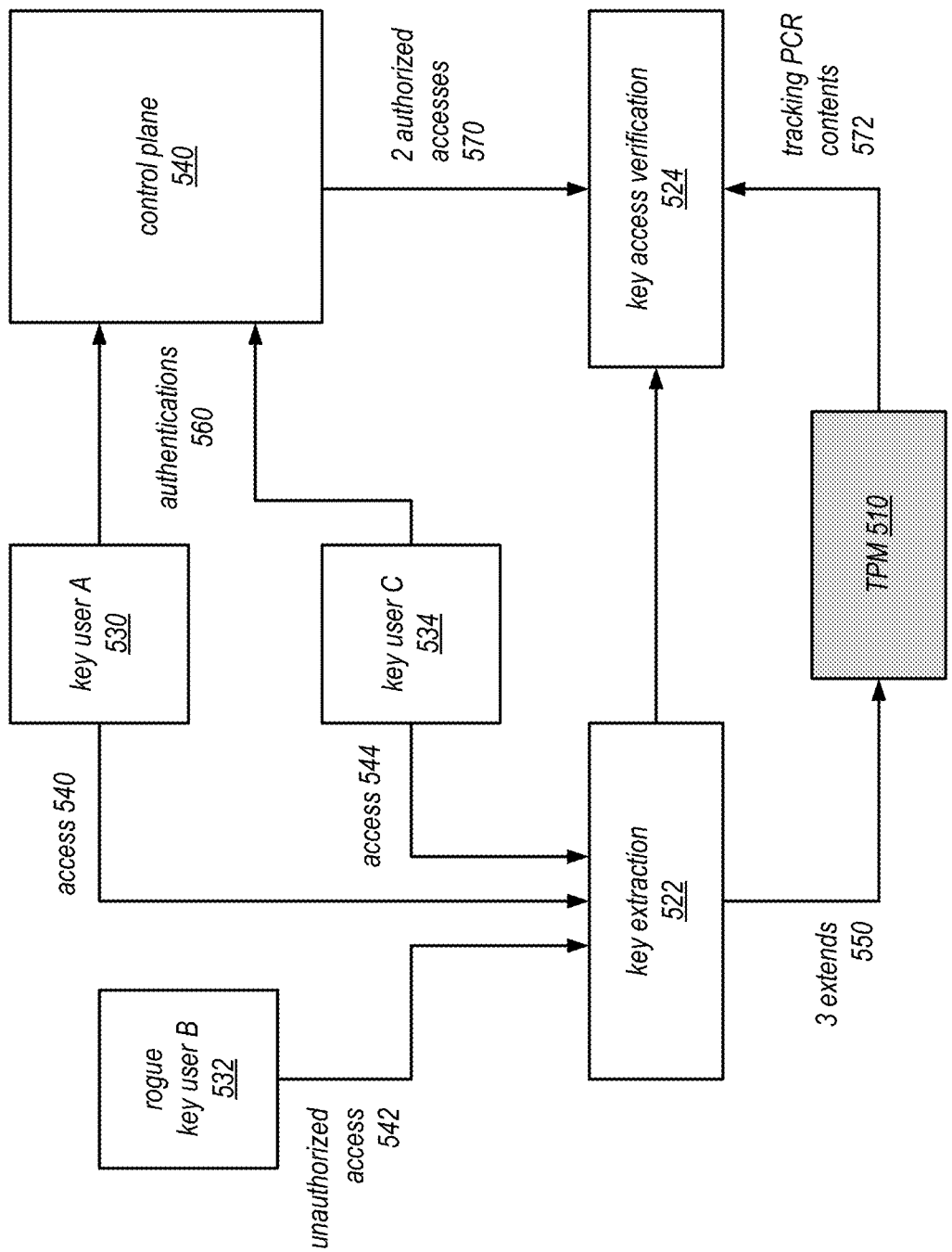
FIG. 5 is a block diagram illustrating a server that uses TPM-based key usage tracking to detect an unauthorized access of a key, according to some embodiments.

FIG. 5 is a block diagram illustrating a server that uses TPM-based key usage tracking to detect an unauthorized access of a key, according to some embodiments. The figure illustrates a system that employs a TPM 510 to implement key tracking, in a manner discussed in for example in FIGS. 1 to 4. The TPM 510 may be, for example, TPM 110 of FIG. 1. As shown, system may implement a key extraction module 522, which may operate to track accesses to a key. In some embodiments, the key extraction module may perform extends on a PCR of the TPM upon each access, so as to permit the unsealing of an symmetric key that can be used to decrypt the tracked key.

As shown, the key extraction module 522 may be used by a number of key users 530, 532, and 534 of the server 500. In some embodiments, these key users may be software programs running on the same computer as the TPM. In some embodiments, the key users may be remote entities (e.g., remote programs or computers with respect to the computer). In some embodiments, each key user may be a separate instance of an operating system launched via the kexec call, and the key being tracked may be a volume key that is needed by the instances to access a storage volume. For example, in some embodiments, the volume may contain a file system used by the operating system instances.

As shown, in this example, key user A 530 may request an access 540 to access the tracked key. In response, the key extraction module 522 extends the TPM 510 to unseal the encryption key for the tracked key, and then provides access to the tracked key. In some embodiments, as shown, key user A 530 may subsequently or simultaneously authenticate 560, register, or identify itself with a control plane 540 or registry, which may keep track of all authenticated key users or authorized accesses of the key. In some embodiments, the control plane 540 may be a local agent of a master control plane system, where the local agent is running on the computer coupled to the TPM 510. In some embodiments, where each user will only access the key once, there will be a one-to-one mapping of authenticated users to authorized key accesses. In some embodiments, the control plane component 540 may maintain a count of all authorized key accesses based on authentications or other interactions with the key users (e.g., key users A 530 and C 534). In some embodiments, the control plane 540 may make a separate call to the TCB on the computer, to pass the authorized access count to the TCB. In some embodiments, the TCB may call the control plane 540 to retrieve the authorized access count.

As shown, in this example, a rogue key user B 532 may also request another key access 542. The key may be provided via the key extraction module 522, and the TPM's tracking register (e.g., PCR B 124 of FIG. 1) may be extended to track the key access 542. However, because key user 532 is a rogue user, it may not attempt to, or cannot successfully, authenticate or register itself with the control plane 540. Accordingly, the control plane 540 may not add this access 542 to its authorized access count.

As shown, in some embodiments, the three key accesses by the three key users A, B, and C may cause the key tracking PCR in the TPM 510 to be extended three times. However, the authorized access count reported by or obtained from the control plane 540 may only reflect two authorized accesses, as shown. As shown, in some embodiments, a key access verification module 524 in the TCB 520 may use both of these sources of information to perform a verification of the contents of the key tracking PCR. Thus, in some embodiments, the key access verifier 524 may compute an expected access state of the key, based on the authorized access count and the derivation function. This expected access state may then be compared against the access state contained in the key tracking PCR. If a mismatch is detected (as in this example), the mismatch may be treated as an indication of an unauthorized access of the key.

As a result of the mismatch, in some embodiments, an access error may be generated. For example, in this example, a subsequent access 544 by the key user C 534 may generate an access error. In response to the error, the key extraction module 522 may generate an alert of a potential unauthorized access. In some embodiments, the server 500 may raise an administrator alert. In some embodiments, other information for the rogue key user B may also be tracked by the TPM, for example by capturing other information about key user B (e.g., an ID of key user B or the time of access). In some embodiments, such information may also be extended into the key tracking PCR (or some other PCR), or stored in a log maintained by the TCB, so that information about the rogue key user B may be retrieved and analyzed later.

Figure 6:
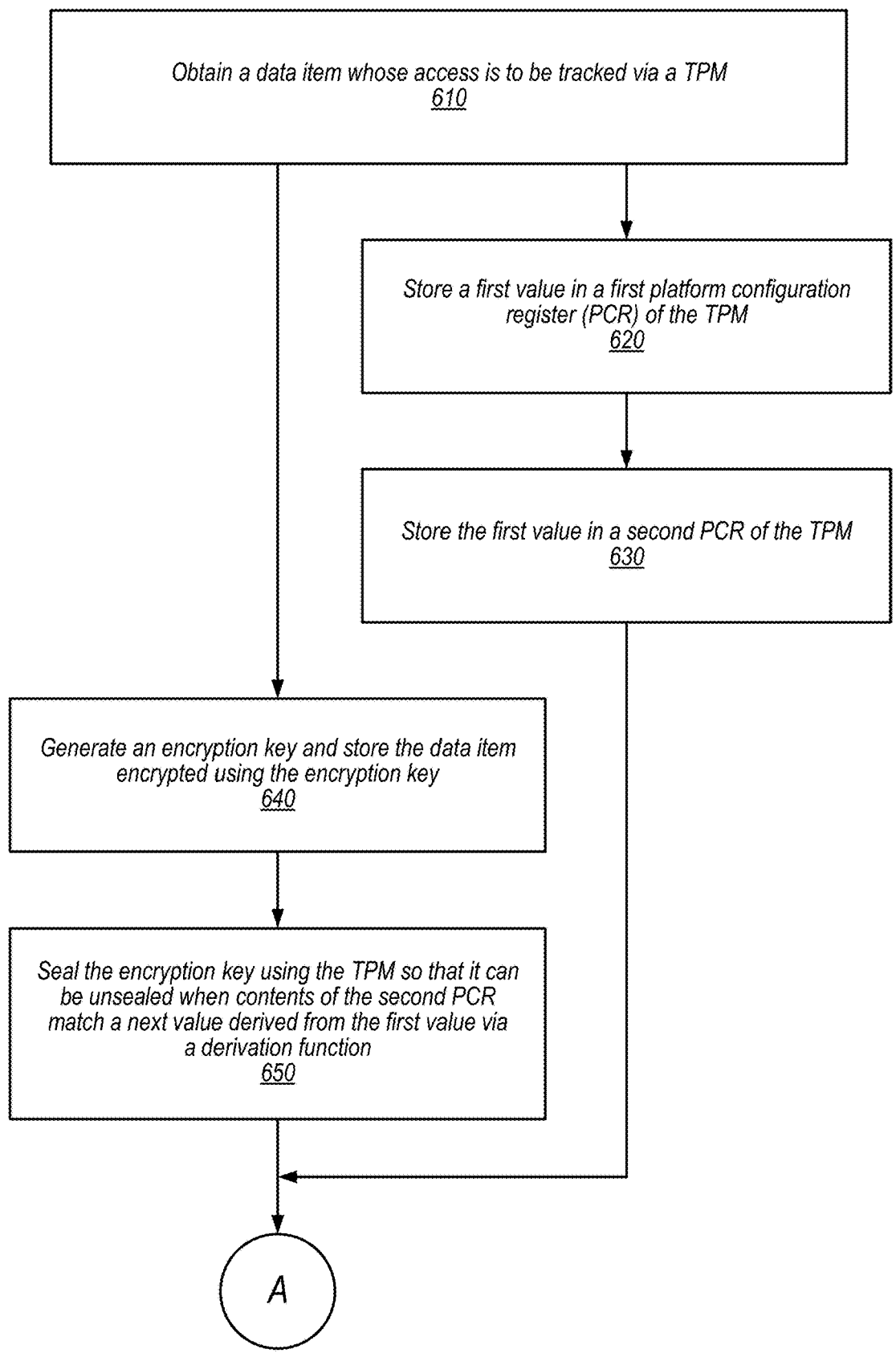
FIG. 6 is a flowchart illustrating a process of initializing usage tracking for a key using a TPM, according to some embodiments.

FIG. 6 is a flowchart illustrating a process of initializing usage tracking for a key using a TPM, according to some embodiments. The process of FIG. 6 may be performed by, for example, the key initializer 132, as discussed in connection with FIG. 1.

At operation 610, a data item whose access is to be tracked is obtained. In some embodiments, this data item may comprise a key. In some embodiments, the key may be a volume key that is used to decrypt a storage device or volume. In some embodiments, the key may already be associated with the TPM. For example, in some embodiments, the key may be obtained by an unseal operation performed via the TPM, so that it is only successful when the PCRs of the TPM are in an expected state. In some embodiments, the key may be obtained immediately following a secure boot sequence of the device associated with the TPM, so that the key can only be extracted following a correct boot sequence.

At operation 620, a first value is stored in a first PCR of the TPM. In some embodiments, the first value may represent an initial access state of the tracked key, and the first PCR may hold the first value so that it is not modified by subsequent accesses of the key. In some embodiments, the first value may be used to recreate a later access state, for example to verify a later access state or generate an access count. In some embodiments, the first value may simply be a fixed value (e.g., a constant or the TPM's endorsement key), and so operation 620 may not be necessary.

At operation 630, the first value is stored in a second PCR of the TPM. In some embodiments, the second PCR may be a tracking PCR whose contents are updated with every key access. In some embodiments, the second PCR may be populated during initialization. In some embodiments, the second PCR may be populated later, when the key is first accessed.

At operation 640, an encryption key is generated, and the data item is stored, encrypted using the encryption key. In some embodiments, the encryption key may be a symmetric key. In some embodiments, the EK may be generated by the TPM in a random or pseudorandom fashion. In some embodiments, to store the data item, the key initializer may store the encrypted key as a BLOB in the secure storage associated with the TPM.

At operation 650, the EK is sealed using the TPM. The EK is sealed so that it can be unsealed when contents of the second PCR match a next value derived from the first value via a derivation function. In some embodiments, the sealing may be performed via a sealing operation of the TPM. In some embodiments, the unseal condition for the EK may specify that the second PCR must hold the next value. The next value may be computed from the first value using the derivation function, which may in some embodiments implement the formula $T_{i+1}=SHA\text{-}1(T_i\|C)$, where $T_i$ is the a first key access state for the key stored in PCR B, $T_{i+1}$ is the next key access state obtained using the derivation function, C is some constant that is appended to and SHA-1 is the cryptographic hash function Secure Hash Algorithm 1. In some embodiments, the constant C may be zero. The BLOB generated for the sealed EK may be stored in the secure storage associated with the TPM, along with the BLOB for the encrypted key. At the end of the initialization process, the TPM is ready to accept and track key access requests.

Figure 7A:
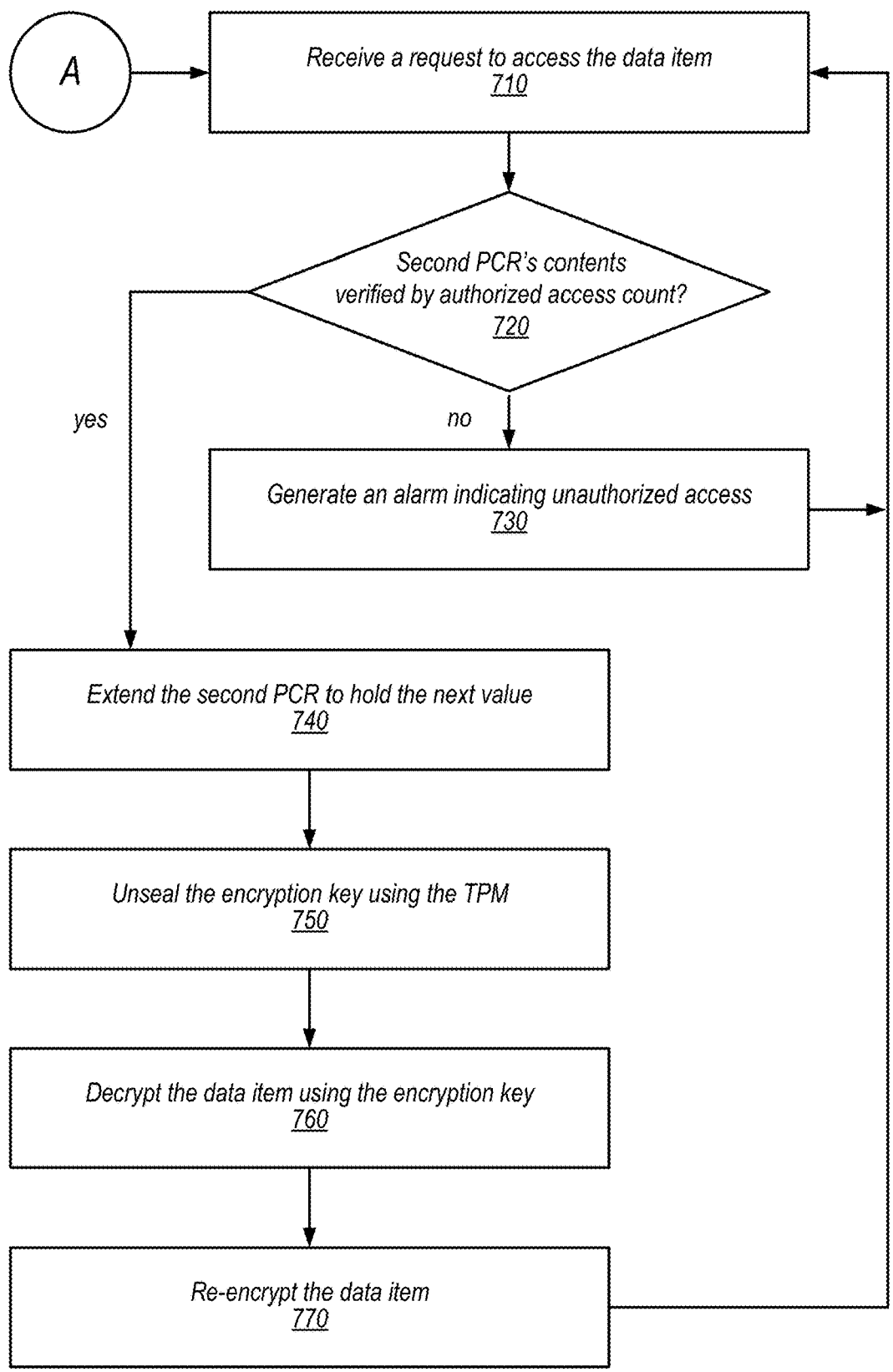
FIGS. 7A to 7C are flowcharts illustrating a process of accessing a key under usage tracking, according to some embodiments.
Figure 7B:
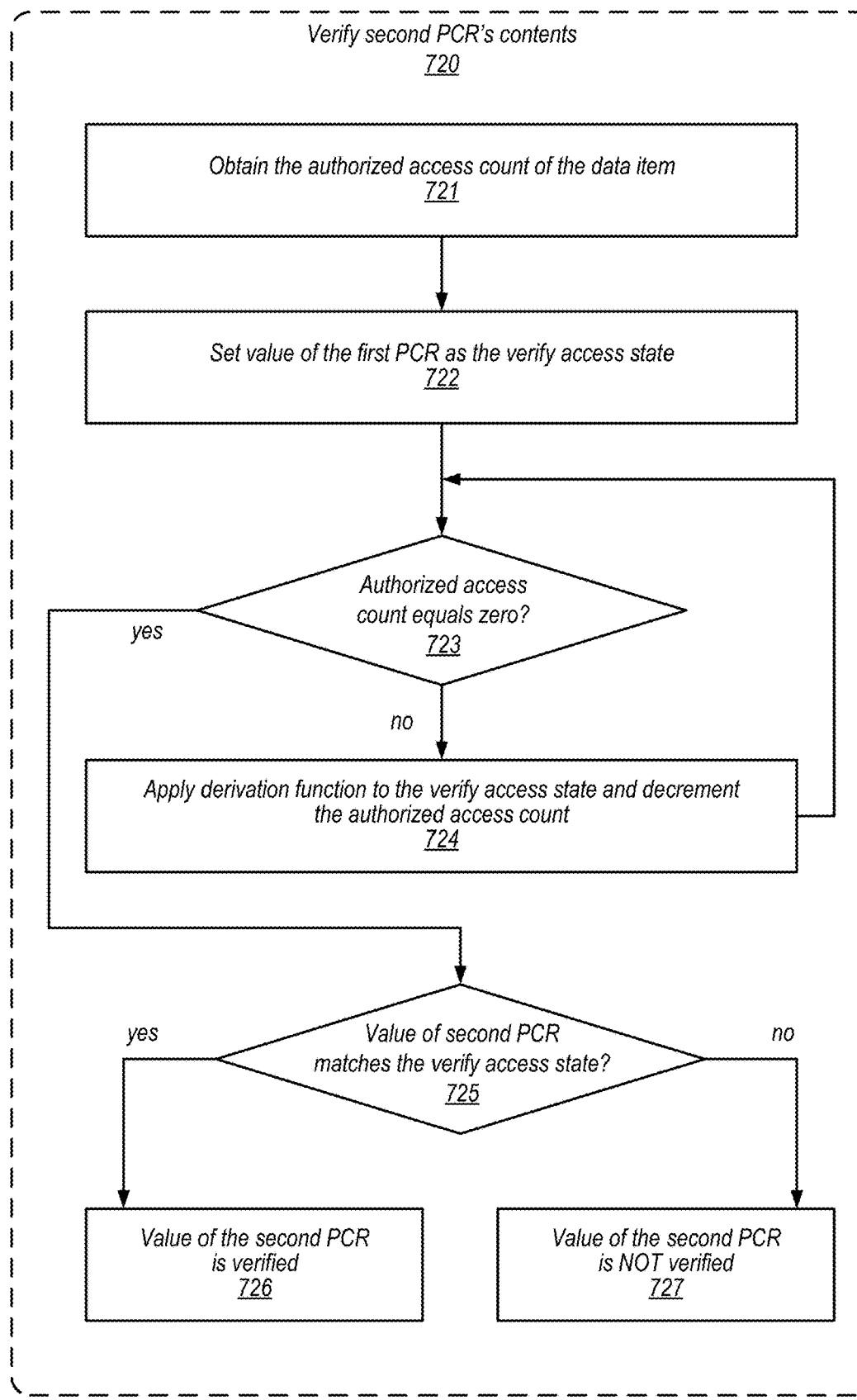
Figure 7C:
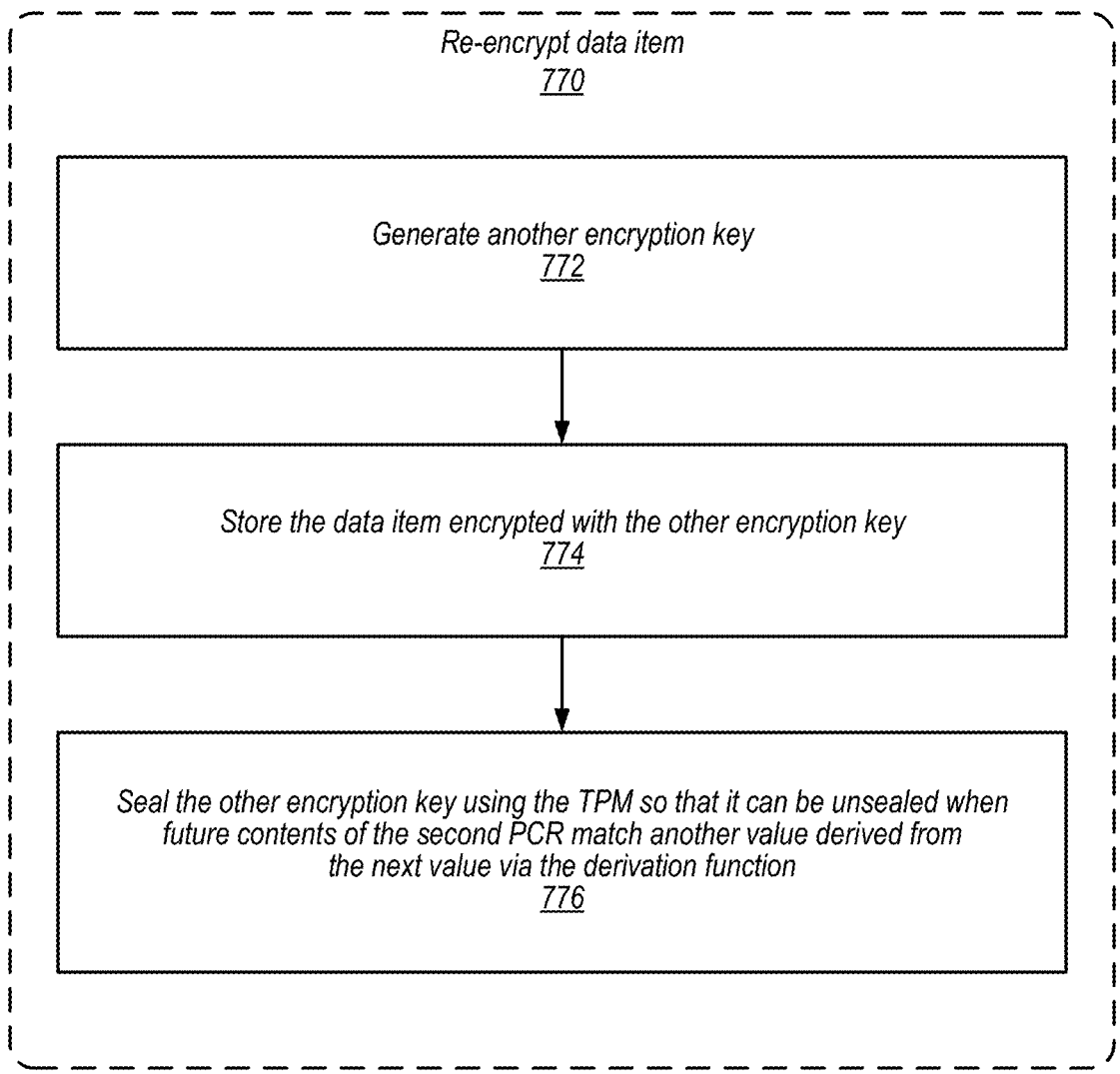

FIGS. 7A to 7C are flowcharts illustrating a process of accessing a key under usage tracking, according to some embodiments. The illustrates processes may be performed by, for example, the key extractor 134 and/or the key access verifier 136, as discussed in connection with FIG. 1. Staring with FIG. 7A, FIG. 7A illustrates an overall process of a key access. As shown, in some embodiments, the process may continue from the initialization process of FIG. 6.

At operation 710, a request to access the data item (e.g. the tracked key) is received. In some embodiments, the request may come from a key user to use or retrieve the tracked key. In some embodiments, key users may be programs executing on the platform associated with the TPM. In some embodiments, key users may be remote from the platform. In some embodiments, the key user may be an instance of an operating system kernel that requests retrieval of a volume key that allows it to access an encrypted storage volume.

At operation 720, a determination is made whether the second PCR's contents are verified against an authorized access count. As discussed, in some embodiments, the contents of the second PCR may reflect a current access state of the key, which may reflect an access count of the key. In some embodiments, the key extractor or TCB may obtain from another source a count of authorized key accesses. This authorized access count may then be used to check the access count in the second PCR. If there is a count mismatch, this condition may indicate an unauthorized access.

As shown, if the verification at operation 720 fails, the process proceeds to operation 730, where an alarm is generated indicating an unauthorized key access. In some embodiments, a verification failure causes the key access process to stop. Furthermore, because the second PCR remains in an invalid state, all subsequent key access requests may also fail. In some embodiments, the generate alarm may trigger further alarms or corrective actions. For example, in some embodiments, an administrator may be alerted. In some embodiments, some or all of the key users may be suspended or shut down. In some embodiments, the device itself may be isolated from the rest of its data center environment. In some embodiments, a report or log may be generated to store the current state of the TPM, TCB, and/or device, so that such information may be later reviewed.

As shown, if the verification at operation 720 succeeds, the process proceeds to operation 740. At operation 740, the second PCR is extended to hold the next value from the derivation function. In some embodiments, the operation may comprise an extension of the constant C of the derivation function to the second PCR. The extension may perform the hash function as specified by the derivation function. As may be understood, when the second PCR holds the next value, the unseal condition for the EK is satisfied.

At operation 750, the encryption key is unsealed using the TPM. In some embodiments, the unseal is performed using a simple unseal call to the TPM, which verifies the contents of the second PCR against the unseal condition, and then provides the EK so that it is not encrypted by the sealing key.

At operation 760, the data item or tracked key is decrypted using the encryption key. As discussed, in some embodiments, the EK is a symmetric key that can be used for both encryptions and decryptions. In some embodiments, the operation may include loading the BLOB from the secure storage associated with the TPM, and the decrypting the BLOB with the EK. In some embodiments, the BLOB may be encrypted in multiple layers using multiple encryption keys, such as for example the SRK of the TPM. These other encryptions layers may also be removed from the tracked key. At this point, the tracked key may be used or returned to the requesting key user. In some embodiments, the system ensures that this process is the only way to access the tracked key, so that every key access will cause an update to the second PCR. Accordingly, the second PCR may be used as a reliable access tracker for the key.

At operation 770, the data item is re-encrypted. In some embodiments, after the key is accessed, the TPM states must be reset to ready it for another key access request. Thus, the operation 770 involves much of the same operations performed during the initialization process for key tracking. In some embodiments, the re-encryption may be performed using the same EK. In some embodiments, a new EK may be generated to encrypt the key. In some embodiments, EK may be sealed against the next derived value via the derivation function. After the TPM states are readied for the next key access, the process loops back to operation 710 to service the new key access request.

FIG. 7B illustrates a more detailed example of operation 720 in FIG. 7A, which relates to the verification of the second PCR's contents. As shown, the process begins at operation 721, where an authorized access count for the data item is obtained. In some embodiments, the authorized access count may be obtained from a control plane component or monitoring entity that tracks or determines the number of authorized access counts of the key. The authorized access count may be determined or inferred via a number of methods. For example, in some embodiments, the authorized key access count may be the number of registered key users known to the system. The count may be provided by the other entity to the TCB, or in some embodiments, retrieved by the TCB at the time of a requested key access.

At operation 722, an iterative process is initiate to determine a verify access state according to the initial access value stored in the first PCR and the obtained authorized access count. First, the verify access state is set to the value of the first PCR, which is the initial access state of the key (i.e., before there has been any accesses). As shown at operation 724, the iterative process then repeatedly applies the derivation function to the verify access state to compute successive access states, and at every iteration, decrements obtained authorized access count. When the authorized access count reaches zero as determined at operation 723, the iterative process stops. At that point, the derivation function has been applied the correct number of times to the initial access state. The final value should reflect the value of the second PCR, if all key accesses recorded in the second PCR have been authorized accesses.

At operation 725, a determination is made whether the value of the second PCR matches the resulting verified access state. If so, the process proceeds to operation 726, where the verifier reports that the second PCR's value is verified. If not, the process proceeds to operation 727, where the verifier reports the second PCR's value is not verified. As discussed, a verification failure at this point may indicate that an unauthorized access of the key has occurred, which may cause an alarm to be generated, and/or other corrective action to be performed.

FIG. 7C illustrates a more detailed example of operation 770 in FIG. 7A, which relates to the re-encryption of the data item. As shown, the process begins at operation 772, where another encryption key is generated. As discussed, in some embodiments, which each access of the tracked key, a new encryption key may be generated to re-encrypt the tracked key. In some embodiments, the new encryption key may be generated in similar fashion as during the initialization process or previous key accesses. For example, in some embodiments, the new EK may be generated using the key generation functionality of the TPM.

At operation 774, the data item is stored, encrypted with the other encryption key. Again, this operation may be performed in similar fashion as during the initialization process or previous key accesses. In some embodiments, each key access will replace the previous key BLOB in the secure storage associated with the TPM with a new key BLOB, which contained the re-encrypted tracked key.

At operation 776, the other encryption key is sealed using the TPM so that it can be sealed when future contents of the second PCR match another value derived via the derivation function. Again, this operation may be performed in similar fashion as during the initialization process or previous key accesses. In some embodiments, the other value may be the next derived value from the current value in the second PCR. As may be understood, each successive value represents an access state of the key, and the access state is easily incremented via the extend operation provided by the TPM.

Figure 8:
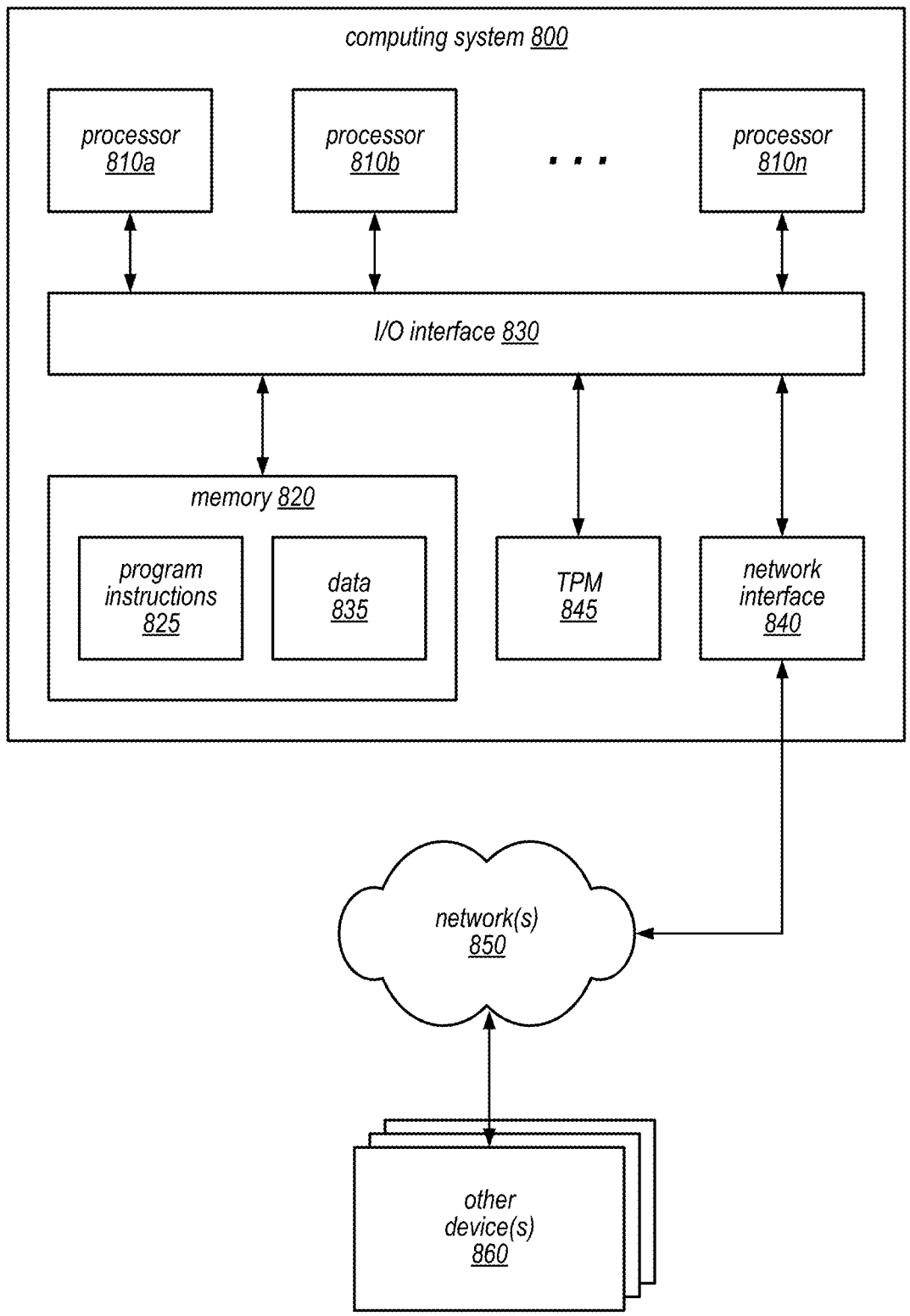
FIG. 8 is a block diagram illustrating an example computer system that can be used to implement key usage tracking using a TPM, according to some embodiments.

FIG. 8 is a block diagram illustrating an example computer system that can be used to implement key usage tracking using a TPM, according to some embodiments. Computer system 800 may include or be configured to access one or more nonvolatile computer-accessible media. In the illustrated embodiment, computer system 800 includes one or more processors 810 coupled to a system memory 820 via an input/output (I/O) interface 830. Computer system 800 further includes a network interface 840 coupled to I/O interface 830.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x96, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 820 as code 825 and data 835.

In one embodiment, I/O interface 830 may be configured to coordinate I/O traffic between processor 810, system memory 820, and any peripheral devices in the device, including a TPM 845, a network interface 840, or other peripheral interfaces. The TPM 845 may be, for example, TPM 110 as discussed in connection with FIG. 1. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices, such as routers and other computing devices, as illustrated in FIGS. 1 through 7, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above for FIGS. 1 through 7 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
    a trusted platform module (TPM) for providing security services for the device; and
    a non-volatile storage containing program instructions that when executed on one or more processors, cause the one or more processors to:
        obtain a data item whose access is to be tracked;
        store the data item, encrypted with a symmetric key;
        determine a first value as an initial access state of the data item;
        store the first value in a platform configuration register (PCR) of the TPM; and
        seal the symmetric key via the TPM such that the symmetric key can be unsealed when contents of the PCR match a next value derived from the first value via a derivation function; and
        responsive to a request to access the data item:
            verify current contents of the PCR based on an authorized access count indicative of a number of times the symmetric key has been unsealed;
            unseal, conditioned upon satisfaction of a match of contents of the PCR to the next value that indicates a subsequent access state of the data item, the symmetric key, wherein the next value is derived from the first value via the derivation function; and
            decrypt the data item using the symmetric key.

2. The device of claim 1, wherein the program instructions when executed on the one or more processors, cause the one or more processors to:
    responsive to the request to access the data item:
        extend the PCR to store the next value in the PCR; and
        unseal the symmetric key via the TPM, conditioned on the extension of the PCR.

3. The device of claim 2, wherein the program instructions when executed on the one or more processors, cause the one or more processors to, subsequent to receiving the request to access the data item:
    generate another symmetric key;
    store the data item, encrypted with the other symmetric key; and
    seal the other symmetric key, wherein unsealing of the other symmetric key is conditioned upon satisfaction of a match of the contents of the PCR to another value derived from the next value via the derivation function.

4. The device of claim 2, wherein the program instructions when executed on the one or more processors, cause the one or more processors to:
    prior to extending the PCR to store the next value in the PCR, verifying that the contents of the PCR match an expected access state of the data item, wherein the expected access state is computed using the derivation function and the authorized access count of the data item.

5. The device of claim 4, wherein the program instructions when executed on the one or more processors, cause the one or more processors to:
    receive another request to access the data item;
    determine that the contents of the PCR do not match another expected access state of the data item; and
    generate an alarm indicating an unauthorized access of the data item.

6. A method, comprising:
    performing, by a device having a trusted platform module (TPM):
        obtaining a data item whose access is to be tracked;
        storing the data item, encrypted with an encryption key; and
        determining a first value as an initial access state of the data item;
        storing the first value in a platform configuration register (PCR) of the TPM; and
        sealing the encryption key via the TPM such that a symmetric key can be unsealed when contents of the PCR match a next value derived from the first value via a derivative function; and
        responsive to a request to access the data item:
            verifying current contents of the PCR based on an authorized access count indicative of a number of times the encryption key has been unsealed;
            unsealing, conditioned upon satisfaction of a match of contents of the PCR to the next value indicating a subsequent access state of the data item, the encryption key, wherein the next value is derived from the first value via the derivation function; and
            decrypting the data item using the symmetric key.

7. The method of claim 6, wherein the data item comprises a protected key secured by the TPM, and obtaining the data item comprises:
- unsealing the protected key based on measurements stored in the TPM's PCRs taken during a secure boot sequence of the device; and
- extending at least one of the PCRs to prevent another unsealing of the protected key based on the measurements.

8. The method of claim 6, further comprising performing, by the device: prior to sealing the encryption key, encrypting the encryption key with a storage root key of the TPM.

9. The method of claim 6, further comprising performing, by the device:
- responsive to said request to access the data item:
  - extending the PCR to store the next value in the PCR; and
  - unsealing the encryption key via the TPM, conditioned on the extension of the PCR.

10. The method of claim 9, further comprising performing, by the device:
- generating another encryption key;
- storing the data item, encrypted with the other encryption key; and
- sealing the other encryption key wherein unsealing of the other encryption key is conditioned upon satisfaction of a match of the contents of the PCR to another value derived from the next value via the derivation function.

11. The method of claim 9, further comprising performing, by the device:
- resealing the encryption key, wherein unsealing the encryption key is conditioned upon satisfaction of a match of the contents of the PCR to another value derived from the next value via the derivation function.

12. The method of claim 9, further comprising:
- prior to extending the PCR to store the next value in the PCR, verifying that the contents of the PCR match an expected access state of the data item, wherein the expected access state is computed using the derivation function and the authorized access count of the data item.

13. The method of claim 12, further comprising:
- receiving another request to access the data item;
- determining that the contents of the PCR do not match another expected access state of the data item; and
- generating an alarm indicating an unauthorized access of the data item.

14. The method of claim 12, further comprising:
- storing the first value in a second PCR of the TPM, wherein contents of the second PCR is not changed as a result of accesses to the data item; and
- wherein the computing of the expected access state is performed using the first value stored in the second PCR.

15. The method of claim 14, further comprising:
- determining the access count of the data item based at least in part on the contents of the PCR and the second PCR.

16. A non-transitory computer-accessible storage medium storing program instructions, wherein the program instructions when executed on one or more processors of a device having a trusted platform module (TPM), cause the device to:
- obtain a data item whose access is to be tracked;
- store the data item, encrypted with an encryption key;
- determine a first value as an initial access state of the data item;
- store the first value in a platform configuration register (PCR) of the TPM; and
- seal the encryption key via the TPM such that the encryption key can be unsealed when contents of the PCR match a next value derived from the first value via a derivation function; and
- responsive to a request to access the data item:
  - verify current contents of the PCR based on an authorized access count indicative of a number of times the encryption key has been unsealed;
  - unseal, conditioned upon satisfaction of a match of contents of the PCR to the next value that indicates a subsequent access state of the data item, the encryption key, wherein the next value is derived from the first value via the derivation function; and
  - decrypt the data item using the encryption key.

17. The non-transitory computer-accessible storage medium of claim 16, wherein the program instructions when executed on the one or more processors cause the device to:
- responsive to said request to access the data item:
  - extend the PCR to store the next value in the PCR; and
  - unseal the encryption key via the TPM, conditioned on the extension of the PCR.

18. The non-transitory computer-accessible storage medium of claim 17, wherein the program instructions when executed on the one or more processors cause the device to:
- generate another encryption key;
- store the data item, encrypted with the other encryption key; and
- seal the other encryption key, wherein unsealing of the other encryption key is conditioned upon satisfaction of a match of the contents of the PCR to another value derived from the next value via the derivation function.

19. The non-transitory computer-accessible storage medium of claim 17, wherein to extend the PCR to store the next value in the PCR, the program instructions when executed on the one or more processors cause the device to:
- extend the PCR with a constant.

20. The non-transitory computer-accessible storage medium of claim 17, wherein the program instructions when executed on the one or more processors cause the device to:
- prior to extending the PCR to store the next value in the PCR, verify that the contents of the PCR match an expected access state of the data item, wherein the expected access state is computed using the derivation function and the authorized access count of the data item.

* * * * *